COMBINED ANTENNA AND TUNNEL DIODE CONVERTER CIRCUIT

Filed June 6, 1960

INVENTORS

John R. Copeland

William J. Robertson

James E. Gilfert

By Anthony D. Cennamo

United States Patent Office 3,296,536
Patented Jan. 3, 1967

3,296,536

COMBINED ANTENNA AND TUNNEL DIODE CONVERTER CIRCUIT

John R. Copeland, William J. Robertson, and James C. Gilfert, Columbus, Ohio, assignors to Ohio State University Research Foundation Filed June 6, 1960, Ser. No. 34,095
7 Claims. (Cl. 325—449)

This invention relates in general to method and means of unifying electronic components and in particular to a novel manner of combining the functional electronic components operable from a source of high frequency signal voltage.

The compactness required by modern day weapon systems and space vehicles is making mandatory the utmost economy of space in packaging of electronic components. This compactness must not be a sacrifice and must maintain the highest possible operating efficiencies. Similarly compactness of design as a manufacturing cost factor and improved operation is always of importance in the developments of commercial electronic products.

Until recently the electronic components, such as, vacuum tubes, capacitors and other circuitry were bulky and cumbersome. Despite every effort for neatness and efficiency conventional items such as electronic receivers and transmitters maintained large space requirements. In addition to a loss of space, these bulky components used in the conventional receivers and transmitters lowered considerably the efficiency of the operation of the system. Further, when electronic systems in higher frequency ranges are considered, efficiency requirements become even more stringent.

In the last decade or so there has been a continual development of parameters leading towards effective miniaturization. The most important being the printed circuit and, more recently the semi-conductors, such as, the transistor. These elements not only permit miniaturization but are inexpensive, small, simple, long-lasting, and more reliable than even the most expensive tubes. Now there has been developed by Dr. Leo Esaki of Japan, another semi-conductor device a negative resistance element, commonly referred to as the tunnel diode.

At the present state of the art it is believed that tunnel diodes can outperform transistors in many aspects. For instance the tunnel diode will have greater sensitivity in the range over 1000 megacycles. Transistors have not been successful at these high frequencies and the vacuum tubes currently in use are larger, heavier and more expensive. Further, it is believed that tunnel diodes will perform more stably under adverse conditions than will transistors and vacuum tubes. Despite these developments in the components per se there continues to be the lack of unification. This is especially apparent where the actual transmitting or receiving apparatus is remoted from the antenna. Generally even though a neat package of miniature components may be assembled and even in the "solid state circuits" the transmission of the signals in the conventional manner from one circuit to the next tends to defeat the intended result. The problem of course becomes more severe as the operating frequency is increased.

The present invention teaches the use of the more recently developed components in a circuit arrangement that is free from the conventional losses and inefficiencies incidental to the transmission of the signal from the point of origin to the ultimate utility device. A circuit and component arrangement without transmission losses is achieved by mounting the components operative at the critical frequencies, such as the tunnel diodes, directly on the antenna itself at the point of radio frequency signal origin.

Accordingly, it is a principal object of the present invention to provide a new and improved integrated and unified design of electronic systems.

Another object of the present invention is to provide an integrated and unified electronic system with an efficiency not obtainable through conventional techniques and packaging.

A further object of the present invention is to provide an electronic system that is broadband, has instant frequency conversion, high signal to noise ratio, can be rapidly frequency scanned with no moving parts, has extreme compactness, lightweight and improved reliability.

Still another object of the present invention is to incorporate the newly developed electronic components such as the tunnel diodes in a circuit arrangement that permits their maximum efficiency without attendant losses normally encountered with conventional components.

Other objects and features of the invention will become apparent from a reading of the following description together with the drawings in which.

Figure 1:
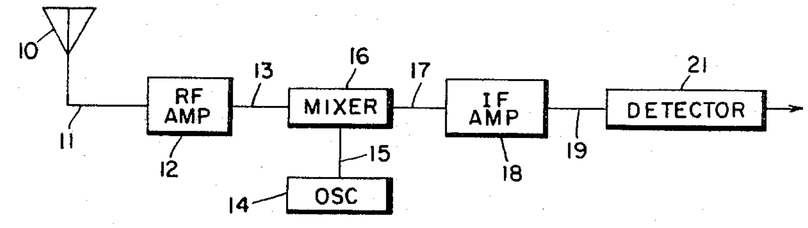
Fig. 1 PRIOR ART
FIG. 1 is a conventional receiving system in block schematic.

Referring now to FIG. 1 there is shown very basically a conventional receiver in block schematic. The radio frequency signals picked up by antenna 10 are conveyed on transmission line 11 to preamp or radio frequency amplifier 12. The amplified signal is heterodyned in mixer 16 with the signal from the local oscillator 14. The difference of the two frequencies is amplified in the intermediate frequency amplifier 18, next detected in detector 21 and then visually or aurally presented.

Although the fundamental operation of the components and circuit is not altered by the frequency of the system, generally speaking the higher the frequency the greater the losses, with an attendant poorer signal to noise ratio. Recent improvements in circuits and components, principally, broadband antennas, parametric amplifiers, transistors, printed circuitry and tunnel diodes have improved considerably the electronic system performance. These improved systems are efficiently operable over ranges and at varying temperatures that were unbelievable just a few years ago. Under conventional diode conversion operation the maximum theoretical conversion efficiency is 50%—typical operating figures are in the order of 10–20% efficiency. With the use of a tunnel diode as a converter, power gain is realized in the down conversion process, providing conversion efficiency in excess of 100%. Efficiency is understood to be radio frequency efficiency as defined by the ratio of the output of the intermediate frequency power divided by input frequency power.

Despite the improvements in operation the efficiency of the electronic systems was yet not satisfactory in the higher frequency ranges for most purposes. Furthermore, the unification or integration of the components to obtain higher operating efficiencies has not been realistically approached. The present invention teaches a unification of components that realizes a true unified design. Specifically, it is customary to remote the receiving antenna, from the converter, intermediate and detector circuits. Similarly in a transmitting system the antenna is remoted from the oscillator, modulator and power amplifier circuits. The antenna is generally remoted to take advantage of height, less interference and other atmospheric advantages. Furthermore because of its size, the antenna is not conductive to packaging or boxing as a component of a system. Accordingly it is found that the signal transmission paths contribute losses. Even where each circuit per se, such as the converter oscillator, is unitized it has been found that the radio frequency transmission lines bridging the circuits and the transmission lines bridging the circuits to the antenna were significant sources of loss and attendant noise.

Figure 2:
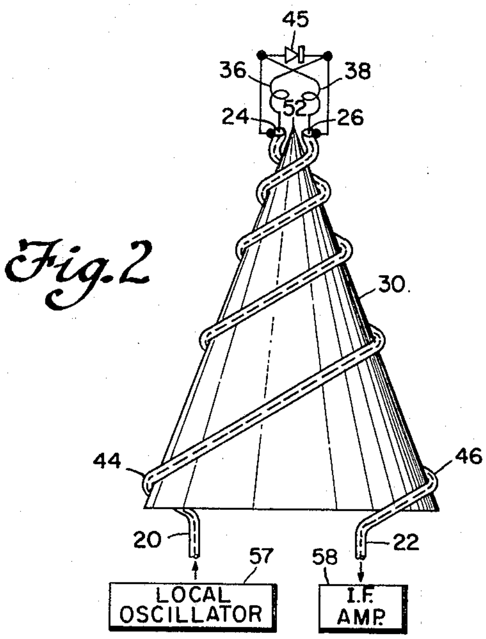
FIG. 2 is a preferred embodiment of the present invention.

The solution of the problem is very difficult or unattainable with conventional components; however, with the introduction of the tunnel diode, it has been found that the complete radio frequency system i.e. radio frequency amplifier and converter may be combined directly at the extreme end or radio frequency signal point of the antenna. This arrangement effectively eliminates the radio frequency transmission lines 11 and 13 of FIG. 1. Referring now to FIG. 2 there is illustrated a preferred constructed embodiment of the present invention. Specifically, as illustrated, the approach is to incorporate the functional elements of the receiver into the antenna structure, providing a radio frequency unit with bandwidth capabilities comparable to that of the antenna itself. The signal "cabled" from the extreme end of the antenna to the detector has been converted to an intermediate frequency—therefore there are no radio frequency signal paths and losses in the lines are negligible. The problem of causing a mismatch of the impedance of the line for each frequency change is also eliminated, thereby permitting rapid spectral scan without moving parts. In addition to improved reliability extreme compactness and light-weight is also realized.

Figure 3:
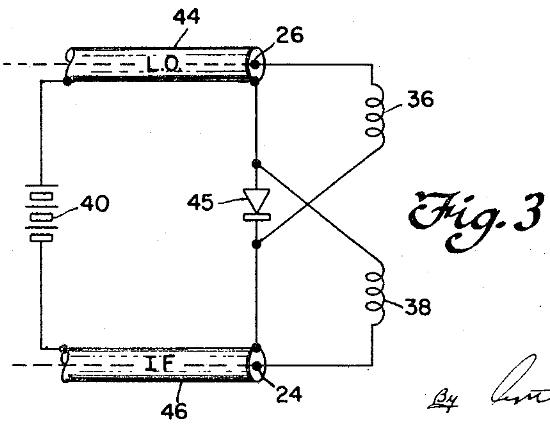
FIG. 3 is a schematic illustration of the preferred embodiment of FIG. 2.

More specifically a balanced equiangular spiral antenna was constructed on a twenty degree cone 30 using 50 ohm cables 44 and 46 for the arms. At the apex 52 of the cone, a mixer tunnel diode 45 is connected between the outer conductors of coaxial cables 44 and 46 along with radio frequency chokes 36 and 38 as shown in FIG. 2 and 3. With a signal frequency of 2830 mc. and a local oscillator frequency of 2430 mc. from local oscillator 57 there is fed at local oscillator input 20 a difference frequency of 400 mc. The difference frequency is then taken at the output 22 and fed to the intermediate frequency amplifier 58. Antenna patterns were made using the detected output of a 400 mc. receiver connected to output 22. The results satisfactorily proved the unification concept. For the operation of the conical antenna reference is made to the October 1959 IRE Transactions starting on page 329 "Unidirectional Equiangular Spiral Antenna" by John D. Dyson and U.S. Patent No. 2,958,081. The tunnel diode used was the ZJ56 Developmental Germanium tunnel diode manufactured by General Electric.

Referring now to FIG. 3 there is shown a schematic diagram of the antenna of FIG. 2. Cable 44 is the local oscillator cable and has an inner conductor 26. Cable 46 is the intermediate frequency cable and has an inner conductor 24. Connected directly across the outer conductors 44 and 46, point to point, is tunnel diode 45 acting as the mixer element. Connected between the output to the tunnel diode 45 and inner conductor 26 is a radio frequency choke 36 conventionally to isolate the radio frequency signal voltage from the local oscillator. Connected between the input of tunnel diode 45 and the inner conductor 24 is a radio frequency choke 38. This choke 38 prevents the radio frequency signal from passing to the intermediate frequency cable. Battery 40 establishes a favorable operating point for the diode and may be located in any position which will not interact with normal antenna operation.

It is to be noted that the antenna and mixer, treated strictly as a passive element without the services of the oscillator or intermediate frequency strip, will provide a broadband video output; thus, it is possible to get both the broadband video output and the narrow band scanned output from the same antenna terminals.

The filter action of the circuit is inherent in the antenna itself. The spiral antenna has the special property of developing the induced potentials at the apex of the cone 20. When the frequency is within the normal range of the antenna no currents exist at the base ends of the conductors 20 and 22. Thus all voltages generated in the mixer and the oscillator voltage are reradiated or attenuated, except that of the difference frequency, which is too low to be radiated.

The antenna shown in FIG. 2 and 3 is, of course, exemplary of only one preferred embodiment and although it is presently believed that the greatest advantages from this invention are in broadband receiver antennas the invention is not to be so limited. The technique of applying the tunnel diode element directly at the point of electrical signal source may readily be extended to other applications. The use of the circuitry further is not limited to any particular frequency band but the beneficial results are more appreciable above 1000 megacycles.

Figure 4:
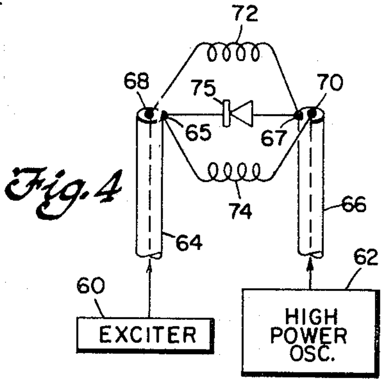
FIG. 4 is a schematic illustration of the present invention with respect to a radio signal transmitting system.

Referring to FIG. 4 the teachings of the present invention are schematically illustrated with respect to a radio signal transmitting system. Connected to cable 66 is the high power radio frequency signal for transmission. This signal is to be modulated by the excitor or modulator 60 connected to cable 64. At the point of signal voltage origin is the tunnel diode mixer circuit. Connected directly across the outer terminals 65 and 67 of the cables 64 and 66 is the tunnel diode 75. Connected from the center terminal 68 of cable 64 to the outer terminal 67 of cable 66 is isolating choke 72 and connected from the center terminal 70 of cable 66 to the outer terminal 65 of cable 64 is isolating choke 74. It is apparent that the operation of this transmitting tunnel diode antenna arrangement is substantially the reverse to that of the tunnel diode receiver antenna arrangement. That is the oscillatory signal from source 62 and the modulating signals from source 60 are mixed in the tunnel diode mixer circuit causing a modulated signal to be emanated therefrom.

For the purposes of clarity and understanding the point of signal voltage origin is understood to be that point where a radio frequency signal leaves free space by impinging upon the receiver antenna. Or conversely where the radio frequency signal to be transmitted leaves the antenna and enters into free space.

Although certain and specific embodiments have been shown and described it is to be understood that modifications may be made thereto without departing from the spirit and scope of the invention.

We claim:

1. An electronic receiver system for receiving radio frequency signals in the over 1000 megacycle frequency range comprising; a two cable antenna operative to receive radio frequency signals in the over 1000 megacycles range, each of said cables having an inner and an outer conductor and a first and second end, the first end being the point of signal origin, a mixer circuit including a tunnel diode connected between the outer conductor of one of said two cables and the outer conductor of the other of said two cables, said tunnel diode further having an input and an output, said input connected directly to the inner conductor of said first cable and the output of said diode connected to said inner conductor of said second cable, both of said connections on said antenna at the point of signal voltage origin, means connected to the second and opposite end of said first cable for feeding a local oscillator signal to said mixer, and utilization means connected to the other end of said second cable for utilizing the difference frequency of said radio frequency signal and said local oscillator signals.

2. An electronic receiver system as set forth in claim 1 wherein said antenna is an unidirectional equiangular spiral antenna.

3. An electronic receiver system as set forth in claim 1 wherein said mixer circuit further includes means for isolating said radio frequency signal from said oscillator signal.

4. An electronic receiver system as set forth in claim 1 wherein said mixer circuit includes means for isolating said radio frequency signal from said oscillator signal and further includes a second isolating means for isolating said radio frequency signal from said intermediate frequency signal, both of said isolating means connected directly to said tunnel diode.

5. An electronic receiver system as set forth in claim 1 wherein said mixer circuit further includes a first isolating means connected across the inner and outer conductors of said two antenna cables, a second isolating means connected to the other inner and outer conductors of said two antenna cables and wherein the input of said tunnel diode is connected to the first of said connections and the output of said tunnel diode is connected to the second of said connections.

6. An electronic transmitting system comprising; a two cable high frequency signal antenna each cable having an inner and an outer conductor and a first and second end, the first end being the point of signal origin, a mixer circuit, including a tunnel diode connected between the outer conductor of one of said two cables and the outer conductor of the other of said two cables, said tunnel diode further having an input an an output, said input connected directly to the inner conductor of said first cable and the output of said diode connected to said inner conductor of said second cable, both of said connections on said antenna cables at the point of signal voltage origin, means connected to the second and opposite end of said first cable for feeding a high power oscillator signal to said mixer and excitor means connected to the opposite end of said second cable for modulating said high power signal.

7. A transmitting system as set forth in claim 6 wherein said mixer circuit further includes means for isolating said mixer element from said high power frequency signal.

References Cited by the Examiner

UNITED STATES PATENTS

| | | | |
|---|---|---|---|
| 2,144,836 | 1/1939 | Dietrich | 250—20.1 |
| 2,153,181 | 4/1939 | Gerhard et al. | 343—701 |
| 2,721,936 | 10/1955 | Byrne et al. | 332—52 |
| 2,780,783 | 2/1957 | Vogeley et al. | 343—701 |
| 2,832,885 | 4/1958 | Brett | 325—449 |
| 2,872,569 | 2/1959 | Bredall | 250—20 |
| 2,958,081 | 10/1960 | Dyson | 343—895 |

FOREIGN PATENTS

| | | |
|---|---|---|
| 1,241,400 | 8/1960 | France. |

OTHER REFERENCES

"Tunnel Diodes as High Frequency Devices," pages 1201–1206 of PIRE for July 1959.

KATHLEEN H. CLAFFY, *Primary Examiner.*

S. B. PRITCHARD, DAVID G. REDINBAUGH, *Examiners.*

ROBERT H. ROSE, W. V. WARREN, W. J. SIMMONS, E. C. MULCAHY, JR., R. F. ROTELLA, R. S. BELL, *Assistant Examiners.*